United States Patent
Huquet et al.

(10) Patent No.: US 11,579,585 B2
(45) Date of Patent: Feb. 14, 2023

(54) METHOD AND SYSTEM FOR OPTIMIZING THE ARRANGEMENT OF A SET OF AIRCRAFT PARTS ON A PLATE

(71) Applicants: Airbus (S.A.S.), Blagnac (FR); Airbus Operations (S.A.S.), Toulouse (FR)

(72) Inventors: Laurent Huquet, Toulouse (FR); Perrine Dupuy, Blagnac (FR); Samuel Drouvroy, Toulouse (FR); Christophe Louat, Blagnac (FR)

(73) Assignees: Airbus (S.A.S.), Blagnac (FR); Airbus Operations (S.A.S.), Toulouse (FR)

( * ) Notice: Subject to any disclaimer, the term of this patent is extended or adjusted under 35 U.S.C. 154(b) by 129 days.

(21) Appl. No.: 17/075,156

(22) Filed: Oct. 20, 2020

(65) Prior Publication Data
US 2021/0116881 A1   Apr. 22, 2021

(30) Foreign Application Priority Data
Oct. 21, 2019   (FR) ..................... 1911746

(51) Int. Cl.
*G05B 19/402* (2006.01)
*G05B 19/18* (2006.01)

(52) U.S. Cl.
CPC ......... *G05B 19/402* (2013.01); *G05B 19/182* (2013.01); *G05B 2219/49372* (2013.01)

(58) Field of Classification Search
CPC ..... G05B 19/402; G05B 19/182; B23K 26/10
See application file for complete search history.

(56) References Cited

U.S. PATENT DOCUMENTS

| | | | | |
|---|---|---|---|---|
| 3,760,623 A | * | 9/1973 | Hempelmann | ........ B21D 28/08 72/336 |
| 4,210,041 A | * | 7/1980 | Mitman | ................ B21D 28/06 83/50 |
| 5,590,046 A | * | 12/1996 | Anderson | .......... G05B 19/4184 700/122 |
| 5,815,398 A | | 9/1998 | Dighe et al. | |

(Continued)

FOREIGN PATENT DOCUMENTS

| WO | WO 99/29479 A1 | 6/1999 |
|---|---|---|
| WO | WO 2018/109301 A1 | 6/2018 |

OTHER PUBLICATIONS

French Search Report for Application No. 1911746 dated May 14, 2020.

*Primary Examiner* — Ronald D Hartman, Jr.
(74) *Attorney, Agent, or Firm* — Jenkins, Wilson, Taylor & Hunt, PA

(57) ABSTRACT

Method and system for optimizing the arrangement of a set of aircraft parts on a plate. The system includes a selection module which selects, from a set of data on the material of the set of parts and a set of geometric data associated with the set of parts, part grouping criteria including at least one optimized plate thickness value, an optimization module for optimizing the arrangement of the set of parts on a plate as a function of the part grouping criteria, cutting criteria and optimization criteria and a transmission module generating and transmitting, to a user system, optimization data representative of the optimization of the arrangement of the set of parts. The system makes it possible to take account of the parameters linked to the dimensions of the plate to optimize the arrangement of the set of parts.

7 Claims, 2 Drawing Sheets

(56) References Cited

U.S. PATENT DOCUMENTS

| | | | |
|---|---|---|---|
| 2003/0114952 A1 | 6/2003 | Scott | |
| 2009/0023112 A1* | 1/2009 | Ganley | A61C 13/0022 |
| | | | 409/117 |
| 2009/0030542 A1* | 1/2009 | Lindstrom | G05B 19/4189 |
| | | | 700/228 |
| 2009/0155615 A1* | 6/2009 | Chen | B21D 53/88 |
| | | | 428/593 |
| 2010/0268373 A1* | 10/2010 | Tremoureux | B26D 5/00 |
| | | | 700/187 |
| 2014/0130459 A1* | 5/2014 | Lundy | G05B 19/41865 |
| | | | 53/147 |
| 2015/0165674 A1* | 6/2015 | Spellman | B29C 69/005 |
| | | | 700/98 |
| 2016/0132049 A1* | 5/2016 | Ben-Bassat | G05B 19/41865 |
| | | | 700/100 |
| 2020/0078973 A1 | 3/2020 | Valeze et al. | |
| 2020/0156137 A1* | 5/2020 | Zalduegui | B23K 26/38 |
| 2021/0170618 A1* | 6/2021 | Held | D06H 7/24 |

\* cited by examiner

METHOD AND SYSTEM FOR OPTIMIZING THE ARRANGEMENT OF A SET OF AIRCRAFT PARTS ON A PLATE

CROSS-REFERENCE TO RELATED APPLICATION

This application claims the benefit of and priority to French patent application 19 11746 filed on Oct. 21, 2019, the entire disclosure of which is incorporated by reference herein.

TECHNICAL FIELD

The disclosure herein relates to a method and a system for optimizing the arrangement of a set of aircraft parts, the parts being intended to be cut from a plate.

BACKGROUND

It is known that certain parts, which individually or collectively form portions of an aircraft, are produced from large metal plates. More particularly, these parts are cut from the plate according to a set of strict rules in order to observe safety standards.

Generally, the parts are arranged virtually on the plate. Then, the latter is cut according to a pattern representing the arrangement of the parts. "Arrangement" is understood to mean the positioning of graphic representations of the parts on an image of the plate. The arrangement of the parts is done so as to minimize the "waste" from the plate, such as the cuttings and chips. Indeed, the plates are costly and the waste from cutting cannot be used subsequently, which represents a potentially significant financial cost.

The quantity of waste is directly linked to the manner in which the parts are arranged on the plate. It is therefore vitally important to arrange a maximum number of parts on one and the same plate while minimizing the space between them, while observing the industrial manufacturing constraints.

Usually, the arrangement of the parts on the plate for them to be cut is done as a function of numerous parameters such as the size and the shape of the parts. Moreover, the arrangement of the parts is very often done in a plate whose dimensions, such as the thickness, are fixed.

However, such solutions are based primarily on the characteristics of the parts to be arranged and do not take account of the dimensions of the plate to optimize the arrangement of the elements. Such solutions do not therefore make it possible to completely minimize the quantity of material used and the weight of the cuttings from the plate derived from the cutting of the parts from the plate. Such standard solutions are not therefore fully satisfactory.

SUMMARY

An object of the disclosure herein is to remedy this drawback. It relates to a method for optimizing the arrangement of a set of aircraft parts on a plate.

According to the disclosure herein, the method comprises the following succession of steps:
- a selection step, implemented by a selection module, consisting in or comprising selecting at least one part grouping criterion from at least one set of material data associated with a material of the set of parts and at least one set of geometric data associated with the set of parts, the at least one part grouping criterion comprising at least one optimized plate thickness value;
- an optimization step, implemented by an optimization module, consisting in optimizing the arrangement of the set of parts on the plate as a function of the at least one part grouping criterion, cutting criteria and optimization criteria; and
- a transmission step, implemented by a transmission module, consisting in generating and transmitting, to a user system, optimization data representative of the optimization of the arrangement of the set of parts on the plate.

Thus, by virtue of the disclosure herein, the arrangement of the set of parts is optimized relative to an additional parameter corresponding to the thickness of the plate. Taking this additional parameter into account makes it possible to minimize the quantity of cuttings from the plate as a result of the cutting or the part production cost.

Advantageously, the method comprises a determination step, implemented by a determination module prior to the selection step, the determination step consisting in or comprising determining an optimized plate thickness value, the determination step comprising the following substeps:
- an acquisition substep, implemented by an acquisition submodule,
consisting in or comprising acquiring one or more tolerance criteria relating to the plate; and
- a computation substep, implemented by a computation submodule,
consisting in or comprising computing the optimized plate thickness value as a function of the tolerance criterion or criteria and of the at least one set of material data associated with the material of the set of parts.

Moreover, preferably, the method comprises a first generation step, implemented by a first generation module prior to the determination step, the first generation step consisting in or comprising generating the at least one set of geometric data associated with the set of parts from information from a structural database.

Furthermore, advantageously, the method comprises a second generation step, implemented by a second generation module prior to the determination step, the second generation step consisting in or comprising generating the at least one set of material data associated with the material of the set of parts as a function of a set of information from the part bill of materials database.

In a first embodiment, the optimization step consists in or comprises optimizing the arrangement of a set of parts comprising only identical parts.

In a second embodiment, the optimization step consists in or comprises optimizing the arrangement of a first set of parts, then of at least one second set of parts, each of the sets of parts being different and comprising only identical parts.

Advantageously, a set of geometric data associated with the set of parts comprises fiber information on each of the parts of the set of parts.

The disclosure herein relates also to a system for optimizing the arrangement of a set of aircraft parts on a plate.

According to the disclosure herein, the system comprises:
- a selection module configured to select at least one part grouping criterion from at least one set of material data associated with a material of the set of parts and at least one set of geometric data associated with the set of parts, the at least one part grouping criterion comprising at least one optimized plate thickness value;
- an optimization module configured to optimize the arrangement of the set of parts on the plate as a function of the at least one part grouping criterion, cutting criteria and optimization criteria; and a transmission module configured to generate and transmit, to a user system, optimization data representative of the optimization of the arrangement of the set of parts on the plate.

Advantageously, the system comprises a determination module configured to determine an optimized plate thickness value, the determination module comprising:

an acquisition submodule configured to acquire one or more tolerance criteria relating to the plate; and a computation submodule configured to compute the optimized plate thickness value as a function of the tolerance criterion or criteria and the at least one set of material data associated with the material of the set of parts.

Moreover, advantageously, the system comprises a first generation module configured to generate the at least one set of geometric data associated with the set of parts from information from a structural database and information from a part bill of materials database.

Furthermore, preferentially, the system comprises a second generation module configured to generate the at least one set of material data associated with the material of the set of parts as a function of a set of information from the part bill of materials database.

BRIEF DESCRIPTION OF THE FIGURES

The attached figures will give a good understanding of how the disclosure herein can be produced. In these figures, identical references denote similar elements.

DETAILED DESCRIPTION

Figure 1:
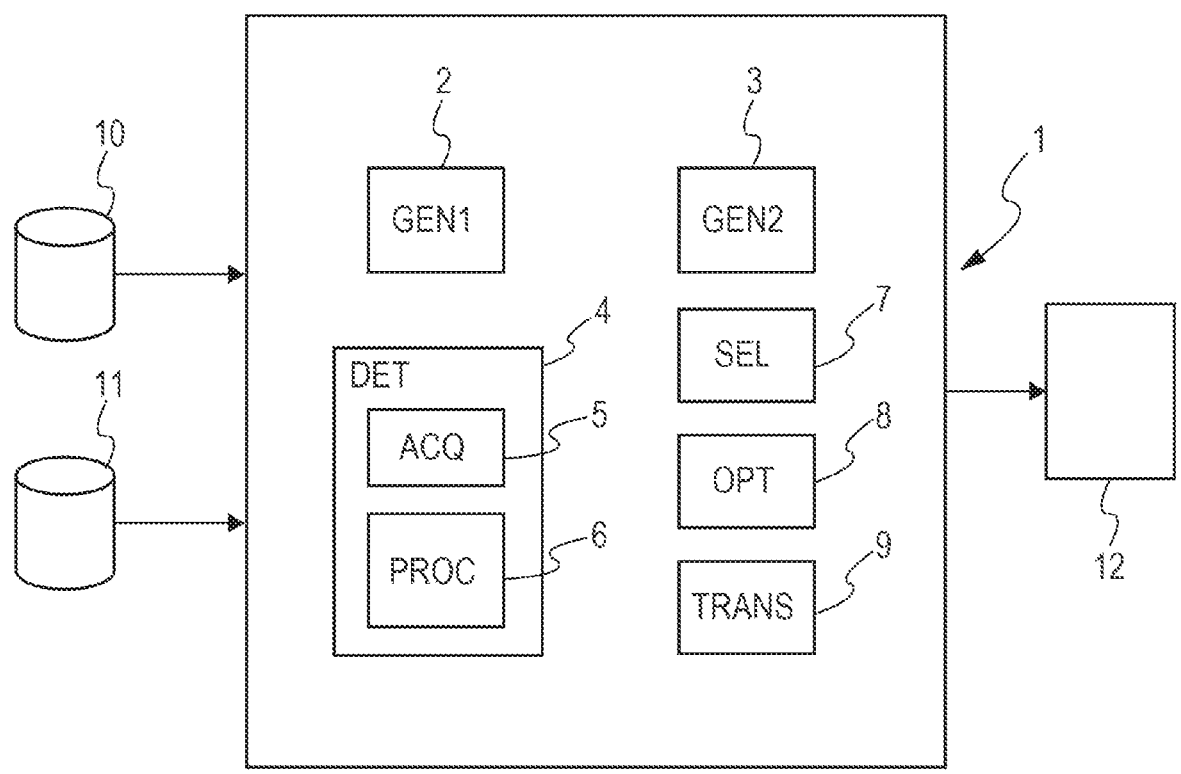
FIG. 1 represents the block diagram of a system for optimizing the arrangement of a set of aircraft parts according to a particular embodiment.

The system 1 used to illustrate the disclosure herein, and represented schematically in FIG. 1, is a system for optimizing the arrangement of a set of aircraft parts on a plate.

In the context of the disclosure herein, "part" is understood to mean the virtual representation of a single-piece, preferably metallic, element which has to be produced in large quantities and which is assembled on its own with other elements to form a portion of an aircraft.

Moreover, in the context of the disclosure herein, "arrangement" is understood to mean the virtual positioning of several parts on a plate. It entails defining an optimal arrangement of parts on the plate by notably using their graphic representations, before actually cutting the plate according to a pattern corresponding to the arrangement. The cutting of the plate according to this pattern produces the elements which are then machined before being used individually or in combination with other elements to form aircraft portions.

Moreover, the cutting of the elements arranged in the plate generates "waste", such as material cuttings and chips. Material "cuttings" are understood to be all the portions of the plate between the elements corresponding to an arranged part.

The optimization of the arrangement performed by the system 1 makes it possible to reduce the space between the parts in order to minimize the size of the material cuttings while observing the industrial manufacturing constraints.

In a first embodiment, the set of parts to be arranged on the plate comprises only parts which are identical. In this first embodiment, the system 1 optimizes the arrangement of parts having the same shape and the same characteristics.

In a second embodiment, the system 1 optimizes the arrangement of a first set of parts in the plate, then of at least one second set of parts in the cuttings from the plate. In this second embodiment, the first set of parts is different from the at least one second set of parts.

In a preferred embodiment, the set of parts is intended to be precut from the plate in which it is arranged optimally before being machined or to be machined directly in the plate. The cutting of the elements corresponding to the set of parts is performed according to a precise scenario. This is, in particular:

a sawing cutting scenario;

a waterjet cutting scenario; and a milling cutting scenario, in the case of precutting then machining of the set of parts in the plate.

When each part is machined directly in the plate, without prior cutting, this is a so-called "toolbox" scenario.

Hereinafter in this description, "cutting scenario" is understood to mean one of the abovementioned scenarios.

As represented in FIG. 1, the system 1 comprises a generation module GEN1 2 ("generation unit") for generating at least one set of geometric data associated with the set of parts (hereinafter "geometric data"). When all the parts to be arranged are identical, the generation module 2 generates a single set of geometric data. When the set of parts to be arranged comprises different parts, the generation module 2 generates a set of geometric data for each different part.

In a preferred embodiment, this generation module 2 generates one or more sets of geometric data from information contained in a structural database 10. The information contained in the structural database 10 is associated with three-dimensional graphic representations of each part. Such information represents, also, the exact length, width and thickness values and the presence of holes and/or irregularities on the surface of a part.

The generation module 2 generates data comprising fiber information on the part with which the geometric data are associated. Moreover, this information also comprises two-dimensional representations of each part. A two-dimensional representation is computed from a three-dimensional representation projected into a plane. When the fiber direction is imposed, the projection is done in the direction of the fiber of the part. The generation module 2 generates, in addition, the exact dimensions of the part from the computation of the smallest volume enclosing the three-dimensional representation of a part.

In the context of the disclosure herein, "fiber information" is understood to mean data relating to the set of fibers that make up a part.

Moreover, as represented in FIG. 1, the system 1 also comprises a generation module GEN2 3 for generating at least one set of material data associated with the material of the set of parts (hereinafter "material data"). A set of material data is representative of a distinct part. It is generated from information in a part bill of materials database 11.

The information contained in the part bill of materials ("Engineering Bill Of Materials" or EBOM) database 11 represents, in particular, an aircraft model AC, and a functional class. A functional class represents information on the part, for example a value or a weight, which depends on the fiber, and on the importance of the part in the aircraft AC in terms of safety. The higher the value or the weight of the functional class of a part, the less important that part is in the aircraft. In the embodiment in which elements are arranged in the cuttings from the plate, these elements correspond to parts whose functional class value is greater than or equal to the functional class value of the first set of parts.

The information contained in the part bill of materials database 11 also represents a material standard relating to a type of material. A material standard depends on the thickness and on the behavior of the material from which the element corresponding to the part is produced. As an example, the elements are produced from a material such as titanium, aluminum and an alloy of aluminum and of lithium.

In a preferred embodiment, the system 1 comprises a determination module DET 4 ("determination unit") which is configured to determine an optimized thickness of the plate in which the parts are arranged. The optimized thickness of the plate is adapted to the parts to be arranged.

As represented in FIG. 1, the determination module 4 comprises an acquisition submodule ACQ 5 ("acquisition unit") which acquires one or more tolerance criteria relating to the plate. A tolerance criterion can be the mechanical characteristic section which represents the greater or lesser depth of each part in the thickness of the plate. A second tolerance criterion can be the dead zone of the plate which represents the thickness of the plate which cannot be inspected by ultrasound inspection means and which has to be eliminated in the cutting of parts of functional class 1. As an example, this or these tolerance criteria comprise predetermined minimum plate thickness threshold values, and predetermined plate flatness tolerance threshold values.

The determination module 4 also comprises a computation submodule PROC 6 ("processing unit") which computes the optimized thickness of the plate as a function of the set or sets of material data generated by the generation module 3 and the tolerance criteria acquired by the acquisition submodule 5. The set of material data associated with this part represent the dimensions of the part, the standard of the material, the functional class, the model of the aircraft and the standard length and width of the plate. The computation submodule 6 computes and determines a new plate thickness value which is optimized as a function of the dimensions of each part. As an example, the optimized thickness of the plate can be equal to twelve millimeters.

In the embodiment in which elements arranged in the cuttings from the plate are taken into account, these elements are selected such that their thickness is less than the thickness of the main elements.

Moreover, when the cutting scenario concerns the toolbox scenario, the computation module 6 computes an optimized plate thickness value from the standard dimensions of the plate.

Moreover, as represented in FIG. 1, the system 1 comprises a selection module SEL 6 ("selection unit"). This selection module 6 is configured to select part grouping criteria from the optimized plate thickness value computed by the computation module 4, from the set or sets of material data supplied by the generation module 3 and from the set or sets of geometric data supplied by the generation module 2.

The part grouping criteria comprise, at least, the optimized plate thickness value.

Moreover, the part grouping criteria also comprise:

a minimum gap value between the parts. This minimum gap value depends on the cutting scenarios of the elements corresponding to the parts on the plate, on the optimized plate thickness value and on the material data supplied by the selection module 3. The minimum gap value between the parts can be equal to 9 millimeters for a sawing cutting scenario. It can be between 9 millimeters and 18 millimeters for a waterjet scenario, between 11.5 millimeters and 40 millimeters for a milling scenario and between 17.5 millimeters and 46 millimeters for a toolbox scenario;

a maximum number of parts per plate. This maximum number of parts per plate depends on the cutting scenario and on the arrangement of a single type of part or of at least two different types of parts. In the case where a single type of part is arranged, as an example, the maximum number of parts per plate is equal to 10 for waterjet, milling or toolbox cutting scenarios. When the cutting scenario involves sawing of the plate, the maximum number of parts per plate can be equal to 2;

symmetries and rotations allowed for each of the parts on the plate as a function of certain material data and of certain geometric data such as the fiber; and a minimum distance value between each of the parts and the edges of the plate. As an example, the minimum distance value between each of the parts and the edges of the plate is approximately equal to 3 millimeters.

In a preferred embodiment, the part grouping criteria also comprise maximum plate length and width values as a function of the material and of the cutting scenario.

As an example, the maximum plate length and width values are, respectively, 10 meters and 2 meters in the case of a waterjet scenario. In the case of a toolbox scenario, the maximum length and width values can be equal to 0.71 meters each.

Moreover, the system 1 comprises, as represented in FIG. 1, an optimization module OPT 8 ("optimization unit"). This optimization module 8 performs an optimization of the arrangement of the set of parts on the plate, from the part grouping criteria selected by the selection module 7. The optimization of the arrangement by the optimization module 8 depends on plate cutting criteria for cutting the part on a cutting table and optimization criteria.

The cutting criteria are representative of the need to hold the plate stable during the cutting in order to avoid any vibrations. The cutting criteria are associated with minimum distance values between the parts to be arranged on the plate and depend on techniques for fixing the plate on a cutting table. The fixing techniques differ according to the cutting scenario considered.

The fixing techniques comprise a fixing of the plate on the table by one or more screws. This type of fixing is used in cutting scenarios such as sawing, waterjet and milling cutting. The minimum distance value depends on the diameter of the screws which is, for example, of the order of 24 millimeters for an aluminum plate and 23 millimeters for a titanium plate.

Moreover, the fixing techniques also comprise a fixing of the plate on the table by one or more vices and is used in a cutting of the elements associated with the parts by a sawing, waterjet and milling cutting scenario. The minimum distance value depends on the plate lengths, widths and thicknesses.

Furthermore, the fixing techniques also comprise a fixing by one or more screws and one or more fixing rails in a toolbox scenario case. The minimum distance value depends on the diameter of the screws and the width of the rails.

As an example:

for a titanium plate, the diameter of the screws is between 23 millimeters and 28 millimeters and the width of the rails is approximately 6 millimeters; and for an aluminum plate, the diameter of the screws is between 24 millimeters and 29 millimeters and the width of the rails is approximately 12 millimeters.

The optimization of the arrangement by the optimization module 8 is also performed for each optimization criterion and determines, at the end of the optimization, what optimization criterion makes it possible to optimize the arrangement.

The optimization criteria are associated either with a minimization of the part grouping costs, or with a minimization of the quantity of the cuttings of materials generated by the cutting of the elements corresponding to the set of parts arranged in the plate.

The cost optimization criterion depends on the dimensions of the plate, on the density of the material and on the total number of parts which are arranged in the plate.

Moreover, the optimization of the arrangement is performed by a "no-fit polygon" and "inner-fit polygon" method.

In a preferred embodiment, the system 1 comprises a transmission module TRANS 9 ("transmission unit"). This transmission module 9 is configured to generate and to transmit optimization data representative of the optimization performed by the optimization module 8. The optimization data comprise, at least, the cutting scenario that makes the optimization possible, a graphic representation of the arrangement of the set of parts on the plate, and the number of parts arranged. In a preferred embodiment, the transmission module 9 transmits the optimization data to a user system 12. This user system 12 can be a storage unit, a data processing unit, etc. It can also comprise a display screen allowing an operator to view the graphic representation of the optimized arrangement of the parts to confirm or not confirm the cutting of the plate.

Figure 2:
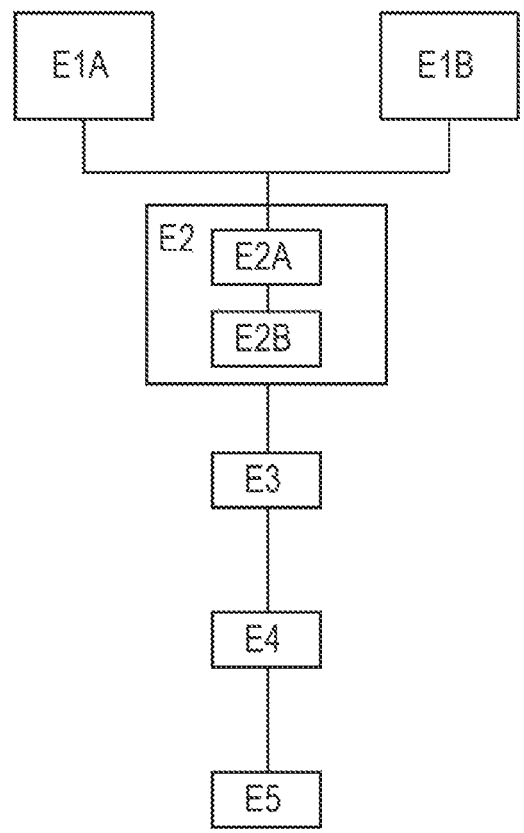
FIG. 2 schematically illustrates the steps of a method for optimizing the arrangement of a set of aircraft parts according to an embodiment of the disclosure herein.

The system 1, as described above, implements a method for optimizing the arrangement of metal parts on a plate, represented in FIG. 2. The method comprises a succession of steps which are generated by the system 1.

In a generation step E1A, the generation module 2 generates a set of geometric data for each distinct part. The geometric data are generated from information contained in the structural database 10, for example fiber information and two-dimensional or three-dimensional graphic representations of the parts.

As represented in FIG. 2, during a generation step E1B which is performed simultaneously with the generation step E1A, the generation module 3 generates a set of material data for each distinct part from information contained in the part bill of materials database 11.

As a variant, the generation step E1A and the generation step E1B are performed in succession.

Moreover, an optimized plate thickness value is then determined by the determination module 4 during a determination step E2. In a preferred embodiment, the determination step E2 comprises an acquisition substep E2A and a computation substep E2B.

As represented in FIG. 2, in the acquisition substep E2A, the acquisition submodule 5 acquires tolerance criteria relating to the plate. These tolerance criteria are then used, during the computation substep E2B, by the computation submodule 6. Based on the flatness tolerance threshold values and the minimum plate values in particular, the computation submodule 6 computes a plate value which is optimized relative to the dimensions of the parts, for example.

Then, in a selection step E3, the selection module 7 selects part grouping criteria. These part grouping criteria determine the conditions of optimization of the arrangement of the set of parts on the plate. One of the part grouping criteria is the optimized plate thickness value which was determined by the determination module 4 during the determination step E2. In a particular embodiment, another part grouping criterion concerns the fiber of each distinct part to be arranged in the plate. The fiber is information contained in the set of geometric data generated by the generation module 2 in the generation step E1B. This part grouping criterion means that a part must be arranged on the plate so that its fiber corresponds to the fiber of the metal plate in order to guarantee the production of solid parts.

The optimization module 8 performs, during an optimization step E4, the optimized arrangement of the set of parts on the plate on the basis of the part grouping criteria selected by the selection module 7 in the selection step E3. The optimization is performed by the no-fit polygon and inner-fit polygon method as a function of the cutting criteria associating fixing techniques with each of the cutting scenarios, for each optimization criterion.

The optimization consists in or comprises placing a first part in a top left corner of the plate then adding a second part by testing all the possible rotations of that second part which minimize the space occupied by the two parts on the plate. This space occupied by the two parts corresponds to a dual pattern.

It is then possible to reproduce the dual pattern on the entire plate until the maximum number of parts per plate is reached or the plate no longer has free space to arrange a new dual pattern. In parallel, a third part is added on the plate and all the rotations of this third part are tested in order to minimize the space of the plate. This step is repeated until the maximum number of parts per plate is reached or the plate no longer has free space for the addition of a new part. For each arrangement, part by part or by repetition of the dual pattern, the degree of optimization is assessed in light of each of the optimization criteria.

Such an optimization of the arrangement nevertheless generates material cuttings, that is to say spaces of the plate which are not a priori used to manufacture parts of the first set of parts.

In a particular embodiment, the optimization step E4 also seeks to optimize the arrangement of a second set of parts in the cuttings of the plate.

These parts are of a thickness and of functional classes lower than or equal to that of the parts of the first set of parts. Finally, during a transmission step E5, the transmission module 9 generates optimization data which result from the optimization performed in the optimization step E4. The transmission module 9 transmits these optimization data to a user system 12. As an example, this user system 12 can be an optimization data storage unit. In a variant, the user system 12 comprises an interface of screen type allowing an operator to view a graphic representation of the arrangement of the set of data.

The system 1, as described above, offers the following advantages:

it makes it possible to take account of the information relating to the fiber of the parts in the optimization of the arrangement;

it makes it possible to take account of all the dimensions of the plate in the optimization of the arrangement; and it makes it possible to define what parameters are minimized by the optimization of the arrangement.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for optimizing an arrangement of a set of aircraft parts on a plate, the method comprising:
   a selection step, implemented by a selection module, comprising selecting at least one part grouping criterion from at least one set of material data associated with material of the set of parts and at least one set of geometric data associated with the set of parts, the at least one part grouping criterion comprising at least one optimized plate thickness value;
   an optimization step, implemented by an optimization module, comprising optimizing the arrangement of the set of parts on the plate as a function of the at least one part grouping criterion, a cutting criteria and an optimization criteria; and
   a transmission step, implemented by a transmission module, comprising generating and transmitting, to a user system, optimization data representative of optimization of the arrangement of the set of parts on the plate.

2. The optimization method according to claim 1, comprising a determination step, implemented by a determination module prior to the selection step, the determination step comprising determining an optimized plate thickness value, the determination step comprising:
   an acquisition substep, implemented by an acquisition submodule, comprising acquiring one or more tolerance criteria relating to the plate; and
   a computation substep, implemented by a computation submodule, comprising computing the optimized plate thickness value as a function of the tolerance criterion or criteria and of the at least one set of material data associated with the material of the set of parts.

3. The optimization method according to claim 2, comprising a first generation step, implemented by a first generation module prior to the determination step, the first generation step comprising generating the at least one set of geometric data associated with the set of parts from information from a structural database.

4. The optimization method according to claim 2, comprising a second generation step, implemented by a second generation module prior to the determination step, the second generation step comprising generating the at least one set of material data associated with the material of the set of parts as a function of a set of information from a part bill of materials database.

5. The optimization method according to claim 1, wherein the optimization step comprises optimizing the arrangement of a set of parts comprising only identical parts.

6. The optimization method according to claim 1, wherein the optimization step comprises optimizing the arrangement of a first set of parts, then of at least one second set of parts, each of the sets of parts being different and comprising only identical parts.

7. The optimization method of claim 1, wherein a set of geometric data associated with the set of parts comprises fiber information on each of the parts of the set of parts.

* * * * *